Nov. 29, 1949 — W. W. KRAFT ET AL — 2,489,903
FLASH CHAMBER
Filed Jan. 21, 1946 — 2 Sheets-Sheet 1

INVENTORS
Wheaton W. Kraft,
Pierre Lambert and
Charles F. Montross
BY Nathaniel Ely
ATTORNEY Nov. 29, 1949 W. W. KRAFT ET AL 2,489,903
FLASH CHAMBER
Filed Jan. 21, 1946 2 Sheets-Sheet 2

INVENTORS
Wheaton W. Kraft,
Pierre Lambert and
Charles F. Montross
BY Nathaniel Ely
ATTORNEY Patented Nov. 29, 1949

2,489,903

UNITED STATES PATENT OFFICE 2,489,903

FLASH CHAMBER

Wheaton W. Kraft, Scarsdale, Pierre Lambert, Jackson Heights, and Charles F. Montross, New York, N. Y., assignors to The Lummus Company, New York, N. Y., a corporation of Delaware Application January 21, 1946, Serial No. 642,560

4 Claims. (Cl. 183—87)

1

This invention relates to improvements in flash towers or vapor separating chambers.

In the fractionation of a liquid, and particularly various components of hydrocarbons, it has frequently been found desirable to use a flash tower for the preliminary removal of vapor from the liquid. After heating, the liquid vapor material is transferred to a column in which the vaporous material is flashed overhead and the liquid material is collected at a lower point in the column for subsequent draw-off.

In the operation of flash towers, it has been found necessary to provide a very substantial volume for the large amount of vapors that are removed, and if the vapors are to be effectively separated from the liquid it is necessary to have a relatively large cross-sectional area. Commercial equipment generally results in a relatively large diameter and high tower.

In accordance with our invention, we provide an improved form of flash tower which has unique structural characteristics making use of certain successful principles of construction which are for the first time applied to liquid-vapor flash chambers. More particularly, the principal object of our invention is to provide a vacuum flash tower in the form of a sphere with a partition surface area substantially equivalent to the major horizontal cross section of the sphere for the sudden separation of the liquid from the vapors of the feed and utilization of the entire upper or hemispherical portion of the sphere for the complete removal of the liquid material.

More particularly, we provide an improved form of spherical flash chamber operating under vacuum, in which advantage is taken of the inherent structural advantages of the spherical form of construction for resistance to external pressure and for its particular simplicity of mounting of the entrainment separator.

Further objects and advantages of our invention will appear from the following disclosure of a preferred form of embodiment thereof taken in connection with the attached drawings, in which.

In accordance with our invention, we provide

Figure 3:
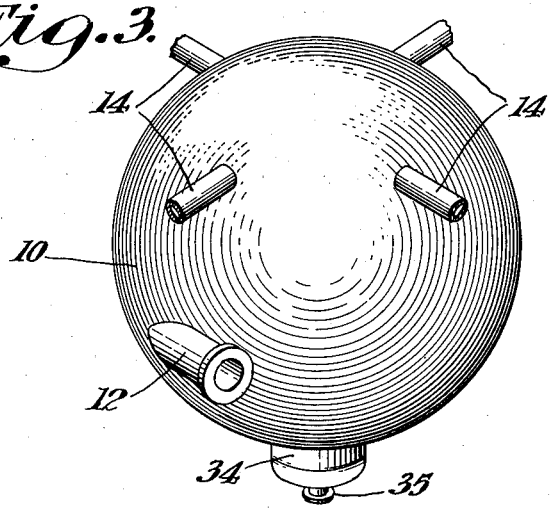
Fig. 3 is an external view of the flash chamber.

2 a chamber generally indicated at 10, supported on legs 11, which is of substantially spherical shape, and to such chamber, as more particularly shown in Fig. 3, we introduce through one or more tangential nozzles 12, a mixture of liquid and vapor from which the vapor is to be separated. Such action is accomplished by change of velocity and by a sudden change of direction of the path of the mixture. The efficiency of flashing is further improved by the use of a centrally and vertically arranged entrainment separator as hereinafter described.

Figure 1:
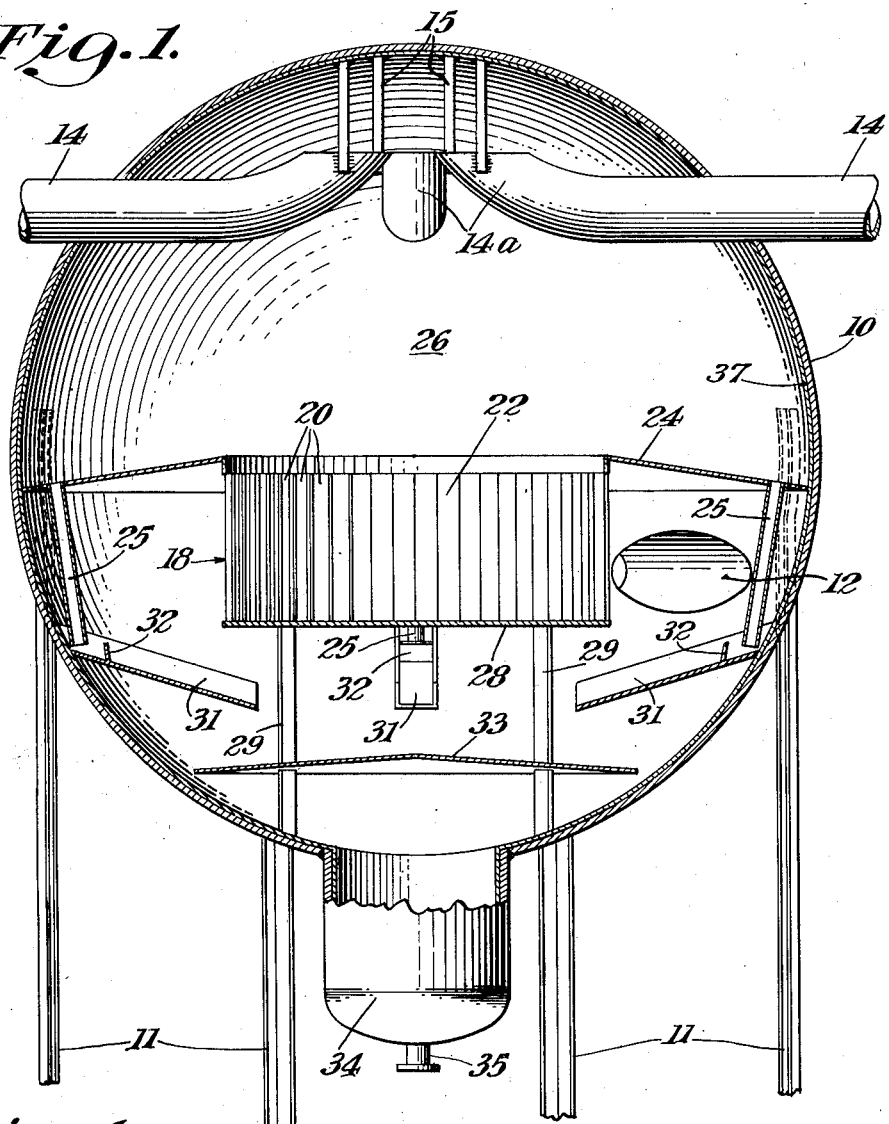
Fig. 1 is a vertical section through an improved form of flash chamber in accordance with our invention.

Preferably, the flash chamber 10 is operated under as near a perfect vacuum as required, (as for example 90 mm. of mercury), being accomplished through the dry pipes 14, of which there may be one or more also. As shown in Fig. 1, each of the dry pipes is provided with an inwardly and upwardly projecting portion 14a, conveniently supported from the top of the chamber 10 by means of beams 15 so that nothing but vapor is removed through the indirectly exposed openings of the pipes 14.

The lower portion of the sphere is provided with the whirl promoting entrainment separator 18. In one form this consists of a plurality of vertically extending, relatively narrow vanes or tuyère blades 20, forming a substantially cylindrical tuyère chamber of the squirrel cage type and generally indicated at 22. The upper portion of the tuyère is provided with a baffle or partition 24 which extends to the wall of the sphere and forms an unbroken surface, except for a plurality of liquid down pipes, generally indicated at 25. The baffle 24 is in sealed relation to the tuyère and conveniently sloped downwardly so that liquid carried out of the wholly open upper end of tuyère chamber 22, or otherwise separated within the vapor chamber generally indicated at 26, will be removed through the down pipes 25 and collected as hereinafter described.

As shown in Fig. 1, the inlet nozzle 12 enters the sphere below the baffle 24 on a level with the separator 18 so that the fluid material must pass through the slot-like tangential passages formed by tuyère vanes 20, and into the central tuyère chamber 22, before it can pass out of the vapor removal pipes 14. The slots or passages formed by the series of tangentially arranged blades 20 all face in the same rotational direction. A reversal of flow through 180° is accomplished by the relative nozzle arrangement with respect to the tuyère blades 20.

This operation results in a very rapid rotation of the liquid vapor mixture, which is induced to move upwardly by the pressure drop, thus forming a substantially helical or vortical path of the vapors out of the tuyère 22 and into the vapor-separating chamber, generally indicated at 26. At this point of largest cross-sectional area, the extremely rapid rotation of the heavy particles will tend to throw out all of the liquid to the periphery of the sphere where it can drop downwardly onto the baffle 24 and the vapors, completely freed of liquid, can then pass out of the vacuum pipes 14 at the top of the sphere. The relatively high ceiling or dome of the chamber 26 allows sufficient time of passage to the outlet to aid in the elimination of the possible liquid which might otherwise be entrapped therewith.

The bottom of the tuyère chamber 22 preferably has an imperforate plate generally indicated at 28 and the entire tuyère arrangement is conviently mounted on legs 29 supported from the bottom of the sphere. Conduits 31 in the form of channels may be provided adjacent the lower ends of the downpipes 25, such conduits having vertical baffles 32 which will form liquid traps adjacent the bottom of the downpipes and prevent by-passing of the vapors up through the downpipes. The conduits 31 conveniently extend to an inward point below the bottom of the tuyère with the liquid flowing off onto the central disengaging baffle 33, which may be a solid conical member, and thence the liquid will flow along the bottom of the sphere to the trap 34 from which a liquid can be drawn off from the nozzle 35.

It is to be noted that the slope of the baffle 24 may be made relatively steep for quick draining and low holdup of the liquid thereby preventing any deleterious reaction which might occur at the temperatures within the chamber.

It is preferable to have the tuyère entirely below the horizontal center line of the sphere. In this way, adequate area can be obtained for the separation of the liquid from the vapors leaving the tuyère chamber 22, and also there is sufficient headroom to insure low velocity flow of vapors with a consequent complete freedom of liquid carryover.

A spherical chamber not only has the advantage of nearly theoretically perfect separating area and height, but also has the advantage of structural strength. Less than one inch of wall thickness is required for a 25 ft. diameter sphere to withstand 15 lbs. per square inch surface pressure, which is equal to a perfect internal vacuum. Conveniently, the chamber may be provided with a liner generally indicated at 37, which is of corrosion-resistant alloy material. No bracing structure is considered necessary, although our invention contemplates the use of a suitable beam or brace if other constructional reasons indicate its desirability.

The very large capacity of a flash chamber of this type is shown by the size required for a separation of 80% vapors from a reduced crude of 21° A. P. I., heated to approximately 790° F. In this case, a sphere of 25 ft. in diameter was found entirely adequate for all process requiremetns to handle a feed of 35,300 barrels per day.

Figure 4:
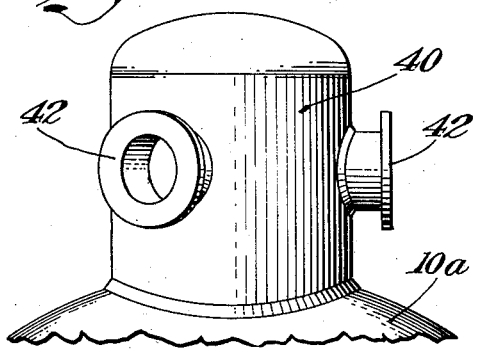
Fig. 4 is a partial elevation of the upper part of a modified form of chamber.
Figure 2:
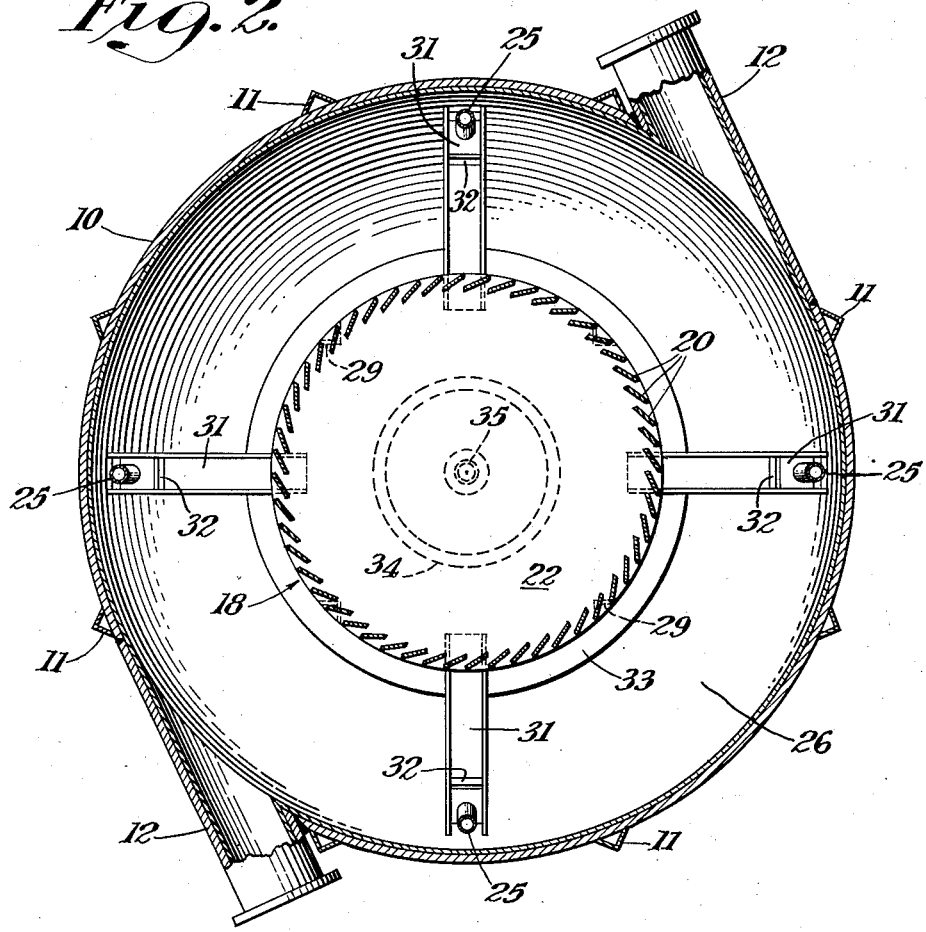
Fig. 2 is a substantially central horizontal cross section of the structure shown in Fig. 1.

It is considered entirely effective to form the dry pipes directly in the sphere as generally indicated in Fig. 3. However, there may be advantages in the modified form of construction shown in Fig. 4 in which a vapor removal bonnet 40 is mounted on the sphere wall 10a. The vapor outlets 42 may then be secured as by welding to the bonnet, the bonnet stress relieved, and the entire bonnet secured as by welding to the sphere. This is a matter of shop practice which may be beneficial for large constructions, it being noted that the vapor lines may be of 24 inch to 30 inch in diameter. With a feed of the heretofore mentioned volume, the inlet nozzles are equally as large, for even with a feed line pressure of five to thirty pounds per inch, the volume of vapors removed is such as to require large vapor discharge lines.

It is also within the contemplation of our invention that a standard form of bubble tray be used in the vapor separation chamber 26, if it is found desirable to further remove the high boiling materials which may be carried over with the vapors. Reflux would be supplied to such a tray in the well known manner.

While we have shown preferred forms of embodiment of our invention, we are aware that modifications may be made thereto, and we therefore desire an interpretation of our invention within the scope and spirit of the description herein and of the claims appended hereinafter.

We claim:

1. A flash chamber of the class described having a hemispherical upper wall, a vapor outlet therein, a tangential inlet nozzle in the lower part of said chamber, and a central transverse baffle having a whirl promoting, liquid vapor entrainment separator mounted in the baffle and dependent therefrom, said baffle being mounted adjacent the horizontal center line of the chamber, said separator being a substantially cylindrical hollow tuyère having a plurality of relatively narrow spaced blades arranged to form slot-like tangential vapor passages in the side wall thereof all of which passages face in the same rotational direction, the bottom of said tuyère being entirely closed, the top being wholly open and in sealed relation to the baffle whereby vapors passing through the entrainment separator will be given an upward rising, relatively rapid vortical path, said baffle serving as a liquid collecting trap for liquid thrown out of the vapors discharging from the tuyère, and means to draw off liquid from said baffle.

2. A flash chamber as claimed in claim 1 in which the chamber is spherical and has a liquid collecting chamber in connection with but outside the lowermost portion of said chamber, and a trap seal in the lower hemisphere of the chamber for the baffle draw off means, said baffle being inclined to minimize liquid hold-up in the chamber.

3. A vacuum flash tower having a tangential vapor inlet, a vapor outlet, and a liquid outlet, said tower being of spherical shape and having a whirl promoting entrainment separator substantially on a horizontal median plane, said entrainment separator being a hollow cylindrical shell that is entirely closed at the bottom and wholly open at the top, the side wall of said shell being formed of a series of relatively narrow tangentially disposed spaced blades arranged to form similarly facing slot-like vapor openings all of which openings face in the same rotational direction whereby the vapors passing through the entrainment separator will be given an upward rising vortical path of high centrifugal effect adjacent the shell of the entrainment separator and thereby forming a central low pressure zone, and a baffle extending from the wall of the sphere substantially adjacent the horizontal median plane and to the entrainment separator to direct vapors toward said openings between the blades, and means to remove liquid thrown out of the vapors as they discharge above the baffle.

4. A spherical vacuum flash tower comprising a whirl promoting entrainment separator disposed centrally in a substantially median plane of the tower, said entrainment separator being a vertically extending hollow cylindrical shell entirely closed at the bottom and wholly open at the top, the side wall of said shell being formed to provide a series of relatively narrow tangentially disposed blades and arranged to form slot-like vapor openings all of which openings face in the same rotational direction; a partition baffle extending horizontally of the tower and in sealing relation to the upper end portion of the entrainment separator to divide the tower into upper and lower chambers; a tangential vapor inlet in the lower chamber on a level with the entrainment separator and faced in the same rotational direction as the slot-like vapor openings; a vapor outlet opening adjacent the top of the upper chamber; a conduit including a trap seal arranged to conduct liquid from above the baffle to the lower chamber below the entrainment separator; and a liquid outlet at the bottom of the lower chamber.

WHEATON W. KRAFT.
PIERRE LAMBERT.
CHARLES F. MONTROSS.

REFERENCES CITED

The following references are of record in the file of this patent:

UNITED STATES PATENTS

| Number | Name | Date |
|---|---|---|
| 977,171 | Zehfus | July 4, 1911 |
| 1,041,589 | Caps | Oct. 15, 1912 |
| 1,775,362 | Demarcus | Sept. 9, 1930 |
| 1,783,813 | Schneible | Dec. 2, 1930 |
| 1,883,908 | Hawley | Oct. 25, 1932 |
| 1,917,606 | Sillers | July 11, 1933 |
| 1,966,241 | Furrer | July 10, 1934 |
| 2,037,316 | Fenske | Apr. 14, 1936 |
| 2,214,658 | Browning | Sept. 10, 1940 |

FOREIGN PATENTS

| Number | Country | Date |
|---|---|---|
| 337,885 | Great Britain | Nov. 13, 1930 |